US010386652B2

(12) United States Patent
Honma

(10) Patent No.: US 10,386,652 B2
(45) Date of Patent: Aug. 20, 2019

(54) LENS DESIGN METHOD, LENS MANUFACTURING METHOD, STORAGE MEDIUM, AND LENS DESIGN SYSTEM

(71) Applicant: NIKON-ESSILOR CO., LTD., Tokyo (JP)

(72) Inventor: Yukio Honma, Tokyo (JP)

(73) Assignee: NIKON-ESSILOR CO., LTD. (JP)

(*) Notice: Subject to any disclaimer, the term of this patent is extended or adjusted under 35 U.S.C. 154(b) by 8 days.

(21) Appl. No.: 15/375,540

(22) Filed: Dec. 12, 2016

(65) Prior Publication Data

US 2017/0090214 A1   Mar. 30, 2017

Related U.S. Application Data

(63) Continuation of application No. PCT/JP2015/067170, filed on Jun. 15, 2015.

(30) Foreign Application Priority Data

Jun. 18, 2014 (JP) .................................. 2014-124957

(51) Int. Cl.
G02C 7/02 (2006.01)
G02C 7/06 (2006.01)

(52) U.S. Cl.
CPC ............. *G02C 7/028* (2013.01); *G02C 7/027* (2013.01); *G02C 7/06* (2013.01); *G02C 7/068* (2013.01)

(58) Field of Classification Search
CPC ........ G02C 7/02; G02C 7/061; G02C 13/003; G02C 7/028; G02C 7/027; G02C 7/068; G02C 7/06; G02C 7/024; G02C 7/025

(Continued)

(56) References Cited

U.S. PATENT DOCUMENTS 6,199,983 B1   3/2001   Kato et al.
6,712,467 B1   3/2004   Kitani
(Continued)

FOREIGN PATENT DOCUMENTS

EP   2 199 845 A1   6/2010
EP   2 202 561 A1   6/2010
(Continued)

OTHER PUBLICATIONS

International Search Report dated Aug. 4, 2015, which was received in international application No. PCT/JP2015/067170 (5 pages).

(Continued)

*Primary Examiner* — William R Alexander
*Assistant Examiner* — Henry A Duong
(74) *Attorney, Agent, or Firm* — Finnegan, Henderson, Farabow, Garrett & Dunner LLP

(57) ABSTRACT

A lens design method includes: changing curve data including a curve value of a distance vision part and a curve value of a near vision part of a progressive power lens on an object side and a curve value of a distance vision part and a curve value of a near vision part of the progressive power lens on an eyeball side so as to be suited to prescription values to calculate a plurality of sets of the curve data; and calculating, for each of the calculated sets of the curve data, a thickness at a second position on the progressive power lens that satisfies thickness conditions for a first position on the progressive power lens.

10 Claims, 5 Drawing Sheets

(58) Field of Classification Search
USPC .................................................. 351/159.75
See application file for complete search history.

(56) References Cited

U.S. PATENT DOCUMENTS

| | | | |
|---|---|---|---|
| 2005/0099596 A1* | 5/2005 | Kato | ....................... G02C 7/061 351/159.42 |
| 2008/0123048 A1 | 5/2008 | Volk | |
| 2010/0141893 A1 | 6/2010 | Altheimer et al. | |
| 2010/0271590 A1 | 10/2010 | Kitani et al. | |
| 2010/0296055 A1* | 11/2010 | Esser | ................... A61B 3/0025 351/204 |
| 2011/0317127 A1 | 12/2011 | Suzuki et al. | |
| 2013/0107205 A1 | 5/2013 | Weatherby | |

FOREIGN PATENT DOCUMENTS

| | | |
|---|---|---|
| JP | 2004-004436 A | 1/2004 |
| JP | 2006-039526 A | 2/2006 |
| JP | 2010-096854 A | 4/2010 |
| JP | 2012-013742 A | 1/2012 |
| JP | 2013-217948 A | 10/2013 |
| WO | WO 2006/084771 A1 | 8/2006 |
| WO | WO2007/010806 A1 | 1/2007 |
| WO | WO2011/030673 A1 | 3/2011 |

OTHER PUBLICATIONS

Written Opinion dated Aug. 4, 2015, which was received in international application No. PCT/JP2015/067170 (6 pages).
Canadian Examiner's Report for Application No. 2,952,189 dated Oct. 20, 2017 (4 pages).
Canadian's Examiner's Report for Application No. 2,952,189 dated Aug. 7, 2018 (4 pages).
European Search Report dated Jan. 16, 2018, which was received in European Application No. 15808933.4 (8 pages).
European Examiner's Report for Application No. 15 808 933.4-1020 dated Nov. 26, 2018 (7 pages).

\* cited by examiner

[TABLE 1]

| No. | FRONT SURFACE | | BACK SURFACE | | CENTER THICKNESS (mm) | EDGE THICKNESS 1 (mm) | EDGE THICKNESS 2 (mm) |
|---|---|---|---|---|---|---|---|
| | DISTANCE VISION PART CURVE (dp) | NEAR VISION PART CURVE (dp) | DISTANCE VISION PART CURVE (dp) | NEAR VISION PART CURVE (dp) | | | |
| 1 | 6 | 6 | 2 | -2 | 7.9 | 0.6 | 4.2 |
| 2 | 6 | 8 | 2 | 0 | 8.2 | 0.6 | 4.4 |
| 3 | 6 | 10 | 2 | 2 | 8.7 | 0.6 | 4.9 |
| 4 | 6 | 12 | 2 | 4 | 9.6 | 0.6 | 5.8 | the previous literature.

LENS DESIGN METHOD, LENS MANUFACTURING METHOD, STORAGE MEDIUM, AND LENS DESIGN SYSTEM

CROSS REFERENCE TO RELATED APPLICATION

This is a Continuation of PCT Application No. PCT/JP2015/067170, filed on Jun. 15, 2015. The contents of the above-mentioned application are incorporated herein by reference.

FIELD OF THE INVENTION

The present invention relates to a lens design method, a lens manufacturing method, a storage medium, and a lens design system.

BACKGROUND

Progressive power lenses are used for spectacle lenses having a distance vision part and a near vision part (see, for example, Patent Literature 1 to Patent Literature 7). Examples of the progressive power lenses include a front-surface progressive lens, a back-surface progressive lens, and a double-surface progressive lens. In general, a front-surface progressive lens is a lens in which an eyeball-side surface is designed as a spherical surface and an object-side surface is designed as a progressive surface. A back-surface progressive lens is a lens in which an object-side surface is designed as a spherical surface and an eyeball-side surface is designed as a progressive surface. A double-surface progressive lens is a lens in which an object-side surface and an eyeball-side surface are each designed as a progressive surface. For wearers with astigmatism prescription, these lenses each have the function of astigmatism correction by combining a cylindrical surface or a toric surface with the eyeball-side spherical surface or progressive surface.

In general, such spectacle lenses are manufactured with use of a semi-finished lens. For a back-surface progressive lens, for example, a semi-finished lens has an object-side spherical surface having a given curve value that is fixed in a predetermined power range (base curve section). For a front-surface progressive lens or a double-surface progressive lens, a semi-finished lens has an object-side surface obtained by combining a spherical surface having a given curve value with a progressive surface having a given addition in a predetermined power range. In any case, the object-side surface is a reference surface that is not processed any more. With reference to the object-side surface, the eyeball-side surface to be processed is calculated and processed in accordance with a prescription (such as distance vision power, near vision power, astigmatic power, and prism) of the wearer. The eyeball-side surface to be processed (correction surface) is a simple surface obtained by combining a progressive surface with a toric surface in some cases and is a complicated surface calculated in consideration of correction such as suppression of astigmatism in other cases. Such a correction surface can now be processed by the advanced freeforming technology.

CITATION LIST

Patent Literature

[Patent Literature 1] Japanese Unexamined Patent Application Publication No. 2013-217948

[Patent Literature 2] Japanese Unexamined Patent Application Publication No. 2010-96854

[Patent Literature 3] International Publication No. 2011/030673

[Patent Literature 4] Japanese Unexamined Patent Application publication No. 2006-39526

[Patent Literature 5] Japanese Unexamined Patent Application Publication No. 2004-4436

[Patent Literature 6] Japanese Unexamined Patent Application Publication No. 2012-13742

[Patent Literature 7] International Publication No. 2007/010806

When a semi-finished lens is used, the design of the eyeball-side surface depends on the design of the object-side surface, and the shape of the reference surface is determined by the base curve section, which inevitably poses limitations in the design of the correction surface. As a result, there is a problem in that the degree of freedom in thickness of a spectacle lens at each position is reduced. The present invention has been made in view of the above-described circumstances, and it is an object thereof to provide a lens design method, a lens manufacturing method, a storage medium, and a lens design system that have a high degree of freedom in thickness of a spectacle lens at each position.

SUMMARY

A first aspect of the present invention provides a lens design method including: changing curve data including a curve value of a distance vision part and a curve value of a near vision part of a progressive power lens on an object side and a curve value of a distance vision part and a curve value of a near vision part of the progressive power lens on an eyeball side under conditions suited to prescription values to calculate a plurality of sets of the curve data; and calculating, for each of the calculated sets of the curve data, a thickness at a second position on the progressive power lens that satisfies thickness conditions for a first position on the progressive power lens.

A second aspect of the present invention provides a lens manufacturing method including: designing a progressive power lens by the lens design method in the first aspect; and manufacturing a progressive power lens in accordance with the design.

A third aspect of the present invention provides a storage medium storing therein a program that causes a computer to execute: changing curve data including a curve value of a distance vision part and a curve value of a near vision part of a progressive power lens on an object side and a curve value of a distance vision part and a curve value of a near vision part of the progressive power lens on an eyeball side under conditions suited to prescription values to calculate a plurality of sets of the curve data; and calculating, for each of the calculated sets of the curve data, a thickness at a second position on the progressive power lens that satisfies thickness conditions for a first position on the progressive power lens.

A fourth aspect of the present invention provides a lens design system including: a first calculation unit that changes curve data including a curve value of a distance vision part and a curve value of a near vision part of a progressive power lens on an object side and a curve value of a distance vision part and a curve value of a near vision part of the progressive power lens on an eyeball side under conditions suited to prescription values to calculate a plurality of sets of the curve data; and a second calculation unit that calculates, for each of the calculated sets of the curve data calculated by the first calculation unit, a thickness at a second position on the progressive power lens that satisfies thickness conditions for a first position on the progressive power lens.

According to the present invention, a lens design method, a lens manufacturing method, a storage medium, a lens design system, and a lens design system that have a high degree of freedom in thickness of a spectacle lens at each position can be provided.

DETAILED DESCRIPTION OF EMBODIMENTS

Figure 1A:
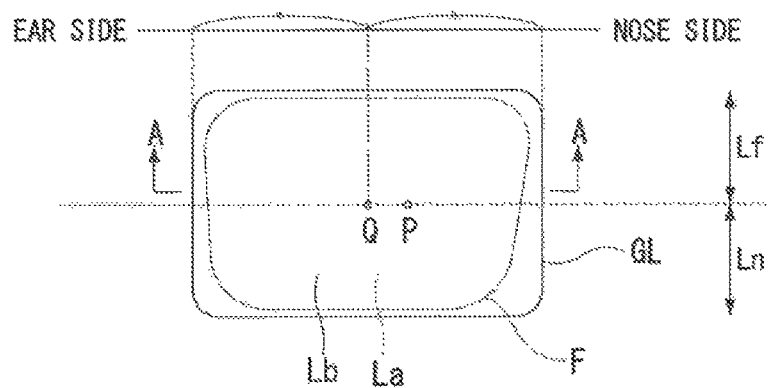
FIGS. 1A to 1C are diagrams showing an example of a spectacle lens.
Figure 1B:
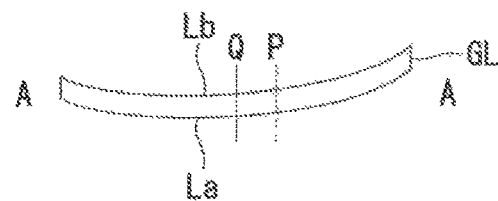
Figure 1C:
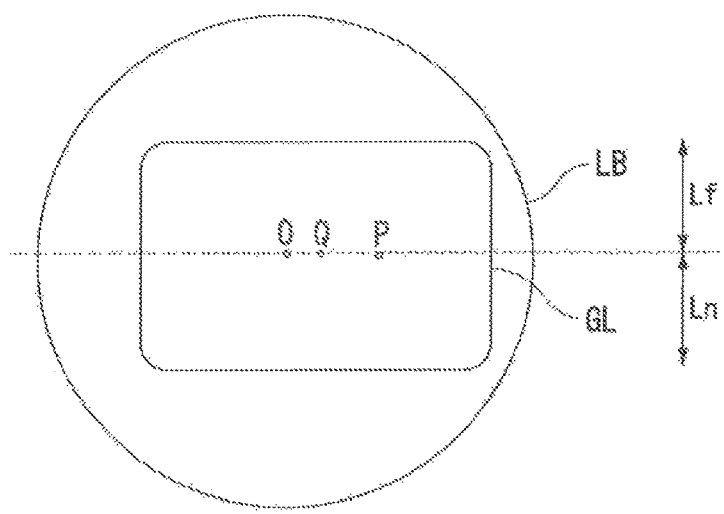

Embodiments are described below with reference to the accompanying drawings. FIGS. 1A to 1C are diagrams showing an example of a spectacle lens GL. FIG. 1A is a plan view of the spectacle lens GL, FIG. 1B is a sectional view taken along the line A-A in FIG. 1A, and FIG. 1C is a plan view showing a relation between the spectacle lens GL and a lens blank.

As shown in FIG. 1A, the spectacle lens GL is a lens formed into a shape similar to the shape of a spectacle frame F in plan view. The planar shape of the spectacle lens GL in FIGS. 1A to 1C is a track shape, but may be another shape such as a circle, an ellipse, and a diamond. FIGS. 1A to 1C show the spectacle lens GL for the left eye. A spectacle lens for the right eye is bilaterally symmetric to the spectacle lens for the left eye, and hence description thereof is omitted.

For example, the spectacle lens GL is formed of plastic or glass. The spectacle lens GL has a predetermined optical center P. The optical center P is formed at a position that matches with a fitting point of a wearer. The fitting point is the position of a pupil (eye point) of the wearer when the wearer wears the spectacle lens GL. The eye point is the position of the line of sight on the lens in the state where the wearer views in the horizontal direction. A geometric center Q is set to the spectacle lens GL.

In the present embodiment, the spectacle lens GL is a progressive power lens including a distance vision part Lf and a near vision part Ln. In the present embodiment, the distance vision part Lf is a region on the upper side of the optical center P when the wearer wears the spectacle lens GL, and the near vision part Ln is a region on the lower side of the optical center P when the wearer wears the spectacle lens GL. The vicinity of a boundary between the distance vision part Lf and the near vision part Ln is a progressive part. In the present embodiment, a region in the progressive part on the upper side of the optical center P is included in the distance vision part Lf, and a region in the progressive part on the lower side of the optical center P is included in the near vision part Ln. The progressive power lens is, for example, a double-surface progressive lens, but may be a front-surface progressive lens or a back-surface progressive lens.

As shown in FIG. 1B, the spectacle lens GL has a front surface La on the object side, which is formed into a convex shape, and a back surface Lb on the eyeball side, which is formed into a concave shape. In the present embodiment, the front surface La and the back surface Lb are each formed by profiling, such as cutting and grinding, of both surfaces of a lens blank LB in accordance with a prescription of the wearer. In the present embodiment, the front surface La and the back surface Lb of the spectacle lens GL are each formed by freeforming.

The lens blank LB is sometimes called lens block, and is a lens that serves as a base for the spectacle lens GL. The lens blank LB is formed into the spectacle lens GL by profiling, such as cutting and grinding. Thus, the lens blank LB is formed of the same material as that of the spectacle lens GL, such as plastic or glass. As shown in FIG. 1C, the lens blank LB is a lens foiled into a circular shape in plan view. The lens blank LB has a geometric center O.

The spectacle lens GL may be manufactured with use of a semi-finished lens. In the semi-finished lens, one of the front surface La and the back surface Lb is an optically designed reference surface, and the other surface is a correction surface to be profiled by freeforming.

A spectacle lens has a plurality of power ranges divided in predetermined ranges between an upper limit and a lower limit of power for which orders are acceptable, and each power range is called "base curve section". For a back-surface progressive lens, the object-side surface of which is a spherical surface, the number of kinds of semi-finished lenses used is the same as the number of the base curve sections. For a front-surface progressive lens, the object-side surface of which is a progressive surface, the number of kinds of semi-finished lenses is the product of the number of base curve sections and the number of kinds of additions. For example, when the number of base curve sections is three and orders are acceptable for additions from 0.75 dp to 3.50 dp in steps of 0.25 dp, the number of kinds of semi-finished lenses is 36 by 3×12. For a double-surface progressive lens, the object-side surface and the eyeball-side surface of which constitute progressive surfaces and the eyeball-side surface of which is generally subjected to cutting or grinding, the number of kinds of semi-finished lenses is smaller than that for a front-surface progressive lens.

For spectacle lenses manufactured with use of such semi-finished lenses, the shape of the reference surface (for example, the front surface La) is determined by the base curve section, and hence there are limitations in the design of the correction surface (for example, the back surface Lb). The thickness of the lens is determined by the difference between the object-side surface and the eyeball-side surface. When the correction surface is designed for the reference surface determined by the base curve section, the degree of freedom of designing the lens thickness is reduced. To address with this, in the present embodiment, the shapes (curves) of the front surface La and the back surface Lb are changed under conditions suited to prescription values, and a combination of curves satisfying thickness conditions of the lens can be selected.

Figure 2:
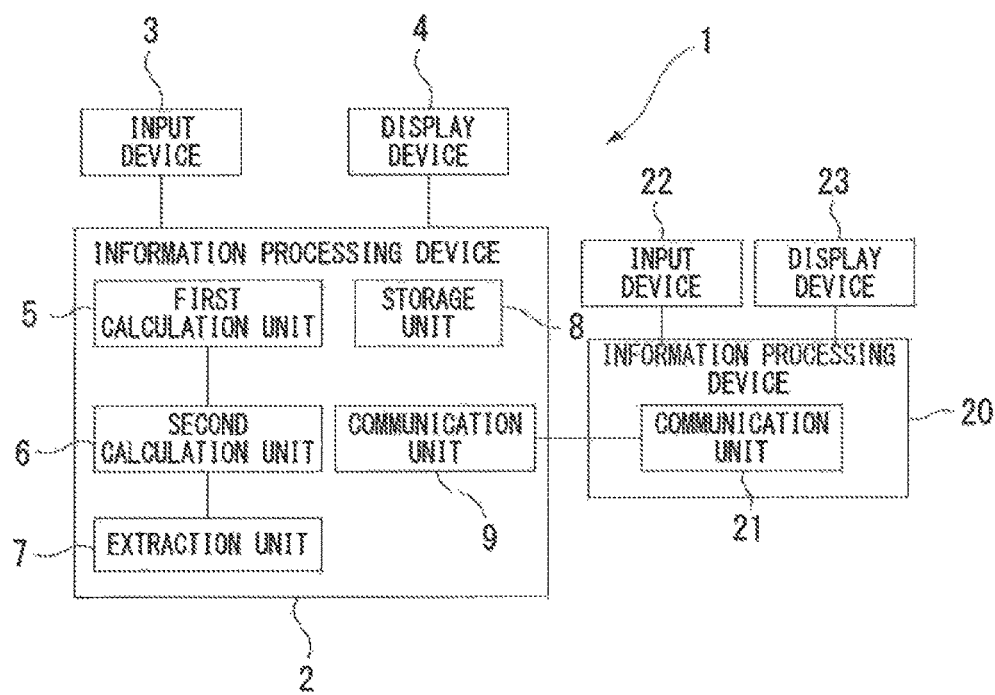
FIG. 2 is a block diagram showing a lens design system according to the present embodiment.

Next, a lens design system according to the present embodiment is described. FIG. 2 is a block diagram showing a lens design system 1 according to the present embodiment.

The lens design system 1 includes an information processing device 3, an input device 3, and a display device 4.

The information processing device 2 uses prescription values for a wearer to calculate the shape of a progressive power lens suited to the prescription values for the wearer. The input device 3 is, for example, a switch, a mouse, a keyboard, or a touch panel. The input device 3 is used to input information such as calculation conditions for the information processing device 2 and prescription values to the information processing device 2. The display device 4 is, for example, a flat panel display such as a liquid crystal display. The information processing device 2 displays, on the display device 4, information input through the input device 3 and various kinds of information such as calculation results of the information processing device 2.

The information processing device 2 according to the present embodiment includes a first calculation unit, 5, a second calculation unit 6, an extraction unit 7, a storage unit 8, and a communication unit 9.

The communication unit 3 can communicate with a device outside the information processing device 2 in a wired or wireless manner. The communication unit 9 can receive information such as prescription values from the device outside the information processing device 2. The storage unit 8 stores therein at least a part of information input to the information processing device 2 through the input device 3 and information supplied to the information processing device 2 through the communication unit 9. For example, the storage unit 8 stores therein calculation conditions for the information processing device 2 and prescription values. The information stored in the storage unit 8 is used for each process by the first calculation unit 5, the second calculation unit 6, and the extraction unit 7.

The first calculation unit 5 calculates a plurality of candidates for a curve satisfying given conditions. Prior to the calculation of the plurality of candidates for the curve, the first calculation unit 5 acquires conditions necessary for the calculation. In the present embodiment, the first calculation unit 5 acquires prescription values for the wearer.

In the present embodiment, the prescription values include the spherical power, the addition, the astigmatism axis, and the astigmatic power, but may include at least one of the vertex distance, the dominant eye, and the near working distance. In the following description, the spherical power is represented by S, the addition is represented by Add, the astigmatism axis is represented by Ax, and the astigmatic power is represented by C as appropriate. The units of the spherical power S, the addition Add, and the astigmatic power C are diopter (dp), and the unit of the astigmatism axis Ax is degree (deg). The prescription values are supplied to the information processing device 2 through the input device 3 or the communication unit 9, and stored in the storage unit 8. The first calculation unit 5 acquires the prescription values by reading the prescription values from the storage unit 8.

The first calculation unit 5 acquires thickness conditions for a first position on the progressive power lens. The first position and its thickness are parameters that can be freely selected by an operator. For example, the edge thickness of the spectacle lens is set to be equal to or more than a predetermined value in terms of securing the strength of the spectacle lens, and in this case, the edge is selected as the first position, and a value that is necessary for securing the strength is selected as the thickness at the edge. For example, the operator can operate the input device 3 to designate the position of the edge of the progressive power lens and designate the thickness at the position.

The edge thickness of the spectacle lens is set in accordance with the form of a frame in some cases. One example of the form of the frame is a rimless frame. The rimless frame is fit to holes opened in the spectacle lens at an end portion on the ear side and an end portion on the nose side. For such a form, at least one of the thickness at the end portion on the ear side or the thickness at the end portion on the nose side is designated so as to secure the strength. Another form of the frame is such that the spectacle lens is supported on the upper end side and not supported on the lower end side. For such a form, the thickness on the upper end side is designated so as to secure the strength. The thickness of the spectacle lens is sometimes designated at the wish of a wearer. For example, the thickness of the spectacle lens may be designated so as not to exceed the thickness of the frame. The operator may be a designer of lenses, a seller of lenses, or a wearer of lenses.

Figure 3:
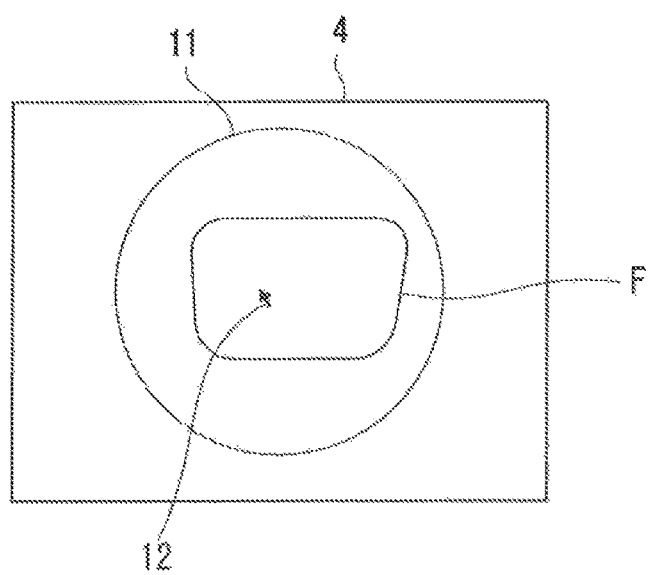
FIG. 3 is an explanatory diagram showing a method of designating thickness conditions.

FIG. 3 is an explanatory diagram showing an example of a method of designating thickness conditions. The information processing device 2 displays a progressive power lens 11 and the spectacle frame F on the display device 4 in a superimposed manner. The operator can operate the input device 3 to move a cursor 12 on the display device 4 to a position to be selected as a first position, and designate the first position by, for example, clicking operation. The information processing device 2 can detect the input made by the input device 3 to acquire coordinates of the first position. The thickness conditions may be designated by inputting numerical values.

The thickness conditions for the first position are supplied to the information processing device 2 through the input device 3 or the communication unit 9, and stored in the storage unit 8. The first calculation unit 5 acquires the thickness conditions for the first position by reading the thickness conditions for the first position from the storage unit 8.

The first calculation unit 5 uses the prescription values and the thickness conditions far the first position to calculate a plurality of candidates for curve data on the progressive power lens. The curve data on the progressive power lens is indicated by a set of curve values including a curve value of the distance vision part Lf on the front surface La side (front distance vision part curve), a curve value of the near vision part Ln on the front surface La side (front near vision part curve), a curve value of the distance vision part Lf on the back surface Lb side (back distance vision part curve), and a curve value of the near vision part Ln on the back surface Lb side (back near vision part curve). In the present embodiment, the curve values are values obtained by converting the radius of curvature into refractive power, and the unit is diopter (dp). A curve value $C_i$ is represented by Expression (1):

$$C_i = (I-1.0) \times 1000/R \qquad (1)$$

where I is the refractive index of a lens base (lens blank) with respect to the e-line and R [mm] is the radius of curvature.

For example, a front distance vision part curve Cf1 is calculated by Expression (1) by using the radius of curvature of the distance vision part Lf on the front surface La. Similarly, a front near vision part curve Cn1, a back distance vision part curve Cf2, and a back near vision part curve Cn2 are calculated by Expression (1) by using the radius of curvature of the near vision part Ln on the front surface La, the radius of curvature of the distance vision part Lf on the back surface Lb, and the radius of curvature of the near vision part Ln on the back surface Lb, respectively.

Distance power Sf corresponds to the different (Sf=Cf1−Cf2) obtained by subtracting the back distance vision part curve Cf2 from the front distance vision part curve Cf1. Near power Sn corresponds to the difference (Sn=Cn1−Cn2) obtained by subtracting the back near vision part curve Cn2 from the front near vision part curve Cn1. The addition Add corresponds to the difference (Add=Sn−Sf) obtained by subtracting the distance power Sf from the near power Sn.

The first calculation unit 5 changes the values included in the curve data under conditions suited to the prescription values to calculate a plurality of candidates (curve data). In the present embodiment, an upper limit value and a lower limit value corresponding to the prescription values are set for each of the front distance vision part curve, the front near vision part curve, the back distance vision part curve, and the back near vision part curve. At least one curve value included in the curve data is a constant (fixed value) depending on prescription values. In this case, the lower limit value is indicated by the same value as the upper limit value.

When an item has an upper limit value and a lower-limit value that are different from each other, the first calculation unit 5 changes a curve value of the item between the upper limit value and the lower limit value. The first calculation unit 5 changes the curve value in steps of a predetermined value (change step). In the present embodiment, the upper limit value, the lower limit value, and the change step of the curve value are referred to as design conditions as appropriate. In the present embodiment, the design conditions are indicated by a table function the arguments of which are prescription values of the spherical power, the addition, the astigmatism axis, and the astigmatic power, and the table function is stored in the storage unit 8. The first calculation unit 5 acquires the design conditions by reading the design conditions from the storage unit 8.

Figure 4:
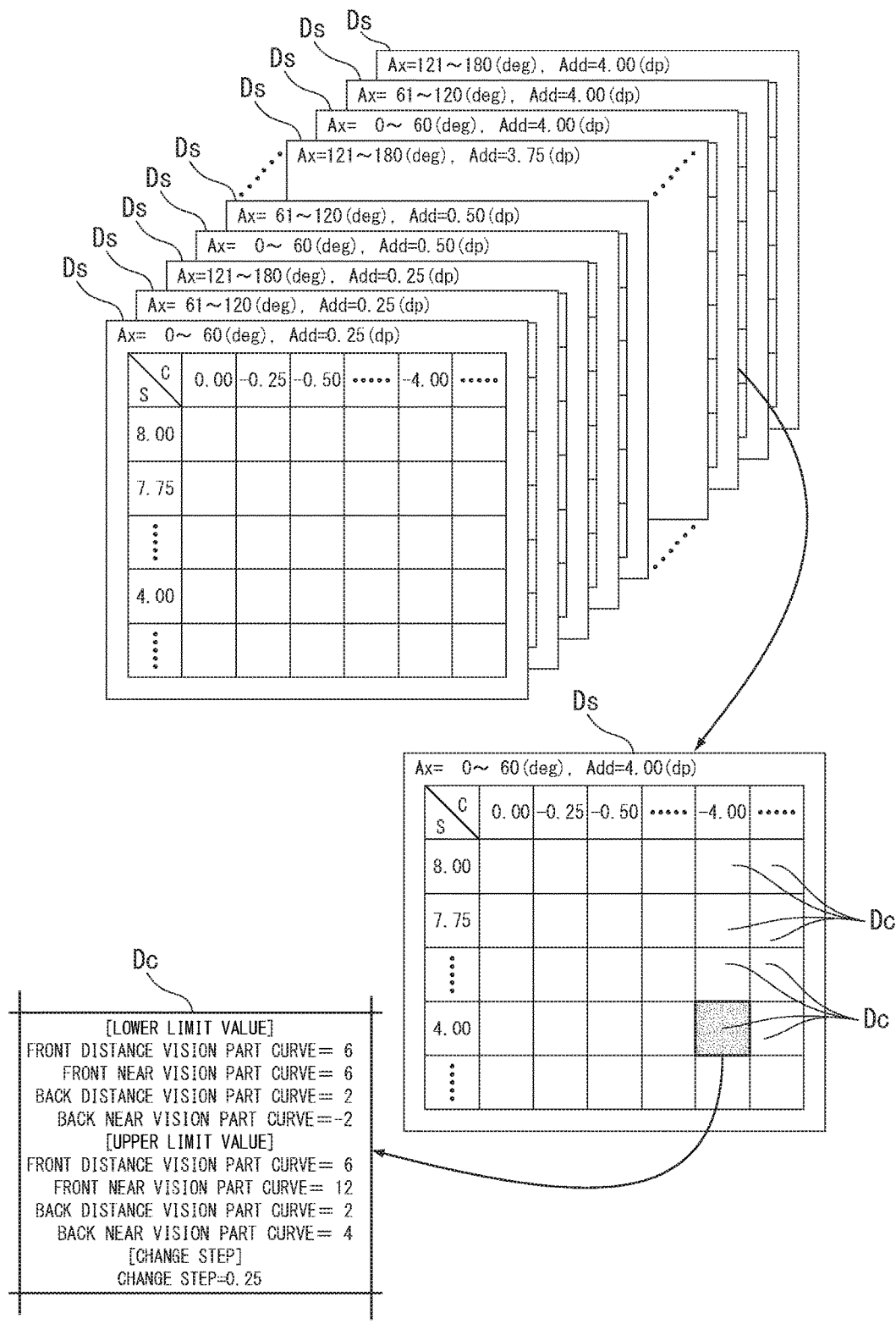
FIG. 4 is a conceptual diagram showing an example of design conditions.

FIG. 4 is a conceptual diagram showing an example of design conditions. In the example in FIG. 4, the design conditions are classified into a plurality of sheets Ds the arguments of which are the astigmatism axis Ax and the addition Add. For example, the astigmatism axis Ax is classified into the range from 0° or more and 60° or less, the range from 61° or more and 120° or less, and the range from 121° or more and 180° or less. For example, the addition Add is classified, in the range from 0.25 to 4.00 in steps of 0.25.

In the example in FIG. 4, each sheet is classified into a plurality of cells Dc the arguments of which are the spherical power S (distance power) and the astigmatic power C. For example, the spherical power S is classified in the range of +8.00 or less in steps of 0.25. The astigmatic power is classified in the range of 0.00 or less in steps of 0.25. In each cell, the upper limit value and the lower limit value of each of the front distance vision part curve, the front near vision part curve, the back distance vision part curve, and the back near vision part are stored. In the present example, the change step used to change curve values is also stored in the same cell as the upper limit value and the lower limit value.

The change step may be a variable value corresponding to prescription values, or stay be a fixed value independent of prescription values. The change step may be set in accordance with the upper limit value and the lower limit value. For example, the change step may fee set to be larger in a cell in which the difference between the upper limit value and the lower limit value is large than in a cell in which the difference between the upper limit value and the lower limit value is small.

On the basis of such a database of design conditions, the first calculation unit 5 reads design conditions suited to prescription values from the storage unit 8. Now, it is assumed that given prescription values indicate an astigmatism axis Ax of 0° or more and 60° or less, an audition. Add of 4.00 (dp), a spherical power S of 4.00 (dp), and an astigmatic power C of −4.00 (dp). The first calculation unit 5 selects a sheet Ds with an astigmatism axis Ax of 0° or more and 60° or less and an addition Add of 4.00 (dp), and reads design conditions stored in a cell with a spherical power S of 4.00 (dp) and an astigmatic power C of −4.00 (dp) in the sheet Ds.

In this example, the lower limit value of the front distance vision part curve Cf1 is 6, the lower limit value of the front near vision part curve Cn1 is 6, the lower limit value of the back distance vision part curve Cf2 is 2, and the lower limit value of the back near vision part curve Cn2 is −2. The upper limit value of the front distance vision part curve Cf1 is 6, the upper limit value of the front near vision part curve Cn1 is 12, the upper limit value of the back distance vision part curve Cf2 is 2, and the upper limit value of the back near vision part curve Cn2 is 4. The change step is 0.25.

In this example, the upper limit value and the lower limit value of the front distance vision part curve Cf1 are the same (6), and the upper limit value and the lower limit value of the back distance vision part curve Cf2 are the same (2). Thus, the first calculation unit 5 does not change the front distance vision part curve Cf1 and the back distance vision pare curve Cf2. The first calculation unit 5 changes one of the parameters of the front near vision part carve Cn1 and the back near vision part curve Cn2 between the upper limit value and the lower limit value in steps of the change step defined by the design conditions. When changing the one parameter, the first calculation unit 5 calculates the other parameter of the front near vision part curve Cn1 and the back near vision part curve Cn2 so as to be suited to the prescription values.

For example, the first calculation unit 5 changes the front near vision part curve Cn1 from the lower limit value (6) with a change step of 0.25 in the range not exceeding the upper limit value (12). Specifically, the first calculation unit 5 changes the front near vision part curve Cn1 from 6.00 to 12.00 through 6.25, 6.50, . . . 11.75.

The difference (Cf1−Cf2) obtained by subtracting the back distance vision part curve Cf2 from the front distance vision part curve Cf1 corresponds to the spherical power S (distance power Sf). In the enlarged cell in FIG. 4, the spherical power S is 4, the front distance vision part curve Cf1 is 6, and the back distance vision part curve Cf2 is 2. The near power Sn is the sum of the distance power Sf and the addition Add. When the distance power Sf is 4 and the addition Add is 4, the near power Sn is 8.

The near power Sn is the difference (Cn1−Cn2) obtained by subtracting the back near vision part curve Cn2 from the front near vision part curve Cn1, and hence when the front near vision part curve Cn1 is Cn1=6.00+0.25×m, where m is a positive integer, the back near vision part curve Cn2 is Cn2=−2.00+0.25×m. In this manner, the first calculation unit 5 calculates carve data suited to prescription values. The first calculation unit 5 stores the calculated curve data in the storage unit 3.

In the example in FIG. 4, the front distance vision part curve Cf1 and the back distance vision part curve Cf2 have fixed values, but when the upper limit values and the lower limit values of the front distance vision part curve Cf1 and the back distance vision part curve Cf2 do not match with each other, the upper limit values and the lower limit values may be changed so that the spherical power S (distance power Sf) of the prescription values satisfies Sf=Cf1−Cf2. The front distance vision part curve Cf1 and the back distance vision part curve Cf2 may be changed, and the front distance vision part curve Cf1 and the back distance vision part curve Cf2 may be changed in accordance with the changed values.

The data structure of data indicating design conditions can be changed as appropriate. For example, in FIG. 4, the astigmatism axis Ax and the addition Add are used as one set of tags, but hierarchies classified by the astigmatism axis Ax may be different from hierarchies classified by the addition Add. Hierarchies classified by the spherical power S may be different from, hierarchies classified by the astigmatic power C, or may be the same as hierarchies classified by the astigmatism axis Ax or hierarchies classified by the addition Add. Similarly, hierarchies classified by the astigmatic power C may be the same as hierarchies classified by the astigmatism axis Ax or hierarchies classified by the addition Add. The amount by which the astigmatism axis Ax, the addition Add, the spherical power S, and the astigmatic power C is incremented can be changed as appropriate.

The first calculation unit 5 may change curve data by using shape information on a frame to be mounted with a progressive power lens and at least a part of wearer information. The wearer information includes at least a piece of information on the vertex distance, the dominant eye, or the near working distance of the wearer.

Returning to the description with reference to FIG. 2, the second calculation unit 6 calculates, for each of the sets of curve data calculated by the first calculation unit 5, the thickness at the second position on the progressive power lens that is determined when the thickness condition at the first position on the progressive power lens is satisfied.

The second position is a parameter that can be freely selected by an operator. Examples of requests include setting the lens shape such that the thickness at the second position becomes the smallest or closer to a predetermined value while the thickness at the first position satisfies a predetermined condition. In such a case, the second position is set to a position at which the thickness needs to be controlled (position subjected to thickness control). For example, the second position is set to the optical center of the progressive power lens. For another example, the second position is set to the edge of the progressive power lens. The second position may be set to a position different from both of the optical center and the edge.

For example, the operator can input the position of the second position through the input device 3. A method of designating the second position may be the same as the method described above with reference to FIG. 3, for example, or may be a method of inputting numerical values (coordinates). The second position input to the information processing device 2 from the input device 3 is stored in the storage unit 8. The second calculation unit 6 reads the second position from the storage unit 8 to calculate the thickness at the second position.

Now, the first position is the position at the lower end in the wearing state. In the present embodiment, the second calculation unit 6 calculates actual values corresponding to each curve data calculated by the first calculation unit 5. For example, the second calculation unit 6 performs calculation by collating the value of the front near vision part curve Cn1 calculated by the first calculation unit 5 with Expression (1), thereby calculating the radius of curvature of the near vision part Ln on the front surface La. The second calculation unit 6 performs calculation by collating the value of the back near vision part curve Cn2 calculated by the first calculation unit 5 with Expression (1), thereby calculating the radius of curvature of the near vision part Ln on the back surface Lb. Then, the second calculation unit 6 determines each position of the front surface La and the back surface Lb in the near vision part Ln so that a gap (thickness) between the front surface La and the back surface Lb in the near vision part Ln has a designated value at the lower end of the spectacle glass during wearing.

For the front distance vision part curve Cf1 and the back distance vision part curve Cf2, the second calculation unit 6 similarly performs calculation by collating the values with Expression (1), thereby calculating actual values of the front surface La and the back surface Lb in the distance vision part Lf. Then, the second calculation unit 6 determines the position of the front surface La in the distance vision part Lf so as to satisfy the condition that the front surface La in the near vision part Ln is continuous to the front surface La in the distance vision part Lf. The second calculation unit 6 determines the position of the back surface Lb in the distance vision part Lf so as to satisfy the condition that the back surface Lb in the near vision part Ln is continuous to the back surface Lb in the distance vision part Lf.

In the manner described above, the second calculation unit 6 determines, for one set of curve data, the position of the front surface La and the position of the back surface Lb in the distance vision part Lf and the position of the front surface La and the position of the back surface Lb in the near vision part Ln. Then, the second calculation unit 6 calculates the thickness at the second position on the basis of information on the determined position of each surface. Similarly, the second calculation unit 6 calculates the thickness at the second position for other curve data. The second calculation unit 6 stores the curve data and the thickness at the second position for the curve data in the storage unit 8 in association with each other.

The second calculation unit 6 may set the shape of at least one of the front surface La or the back surface Lb of the progressive power lens in consideration of additional information in addition to the curve data calculated by the first calculation unit 5. For example, the additional information includes at least one of art eccentric position, a corridor length, addition distribution information, a far point, a near point, and a reference center thickness.

The eccentric position is information indicating a deviation amount between the optical center P and the geometric center Q. The corridor length is information on the length of the progressive part. The addition distribution information is information indicating a planar distribution of the addition. The far point is information on a position that is focused when the wearer does not exercise the accommodation of focus. The near point is information on a position that is focused when the wearer exercises the maximum accommodation of focus. The reference center thickness is information indicating a reference value of the center thickness.

The extraction unit 7 extracts curve data in which the thickness at the second position satisfies a predetermined condition. For example, the predetermined condition is the condition that the thickness at the second position is minimum. The extraction unit 7 reads a plurality of sets of curve data and the thickness at the second position indicated by each curve data. Then, the extraction unit 7 detects (searches for) a minimum value of the thickness at the second position, and extracts curve data associated with the thickness at the second position having the minimum value. For another example, the predetermined condition is the condition that the thickness at the second position is closest to a designated value. In this case, the extraction unit 7 detects the thickness at the second position that is closest to the designated value, and extracts curve data associated with the detected thickness at the second position. The extraction unit 7 stores the extracted curve data and the extracted thickness at the second position in the storage unit 8.

The information processing device 2 can display the information stored in the storage unit 8 on the display device 4. The information processing device 2 can display at least one of the calculation result of the first calculation unit 5, the calculation result of the second calculation unit 6, and the extraction result of the extraction unit 7 on the display device 4. For example, the operator can operate the input device 3 to supply an instruction of requesting the display of various kinds of results (information) to the information processing device 2. In response to the instruction, the information processing device 2 displays the requested information on the display device 4. For example, the information processing device 2 can display curve data in which the thickness at the second position is minimum on the display device 4 on the basis of the calculation result of the second calculation unit 6. The information processing device 2 can display curve data in which the second position is closest to a designated value on the display device 4 on the basis of the calculation result of the second calculation unit 6.

The information processing device 2 can transmit the information stored in the storage unit 8 to an external device through the communication unit 3. In FIG. 2, the communication unit 9 in the information processing device 2 is communicably connected to a communication unit 21 in the information processing device 20. For example, the information processing device 20 is provided at a supply destination of lenses, and can be used as an order reception terminal.

The information processing device 20 is provided with an input device 22 and a display device 23 together. The information processing device 20 displays the progressive power lens on the display device 23 by, for example, the method shown in FIG. 3. The information processing device 20 receives an input of information such as the prescription values, the first position, the thickness conditions at the first position, the second position, and the thickness conditions at the second position through the input device 22. The information processing device 20 transmits the information acquired through the input device 22 to the information processing device 2 through the communication unit 21. For example, the information processing device 2 is provided at a supplier of lenses, and calculates a plurality of lens sets that are suited to prescription values and satisfy thickness conditions for the first position by using the information received from the information processing device 20. For example, the information processing device 2 transmits information on the plurality of calculated lens sets to the information processing device 20 through the communication unit 9.

The information processing device 20 displays information on a plurality of sets of lens sets on the display device 23 on the basis of the information received from the information processing device 2. An operator of the information processing device 20 can select a desired lens set from among the information on the plurality of sets of lens sets displayed on the display device 23. For example, information indicating the selected lens set is input to the information processing device 20 through the input device 22, and the information processing device 20 transmits the information to the information processing device 2. The information processing device 2 can transmit the information on the selected lens set to equipment for profiling lens blanks.

The information processing device 3 may transmit lens set information extracted by the extraction unit 7 to the information processing device 20 together with information on the plurality of calculated sets of lens sets or instead of information on the plurality of calculated sets of lens sets. In this manner, the information processing device 2 and the information processing device 20 may be used as a part of a lens providing system for providing lenses. The information processing device 20 may be a part of the lens design system 1 or may be a device outside the lens design system 1. The information processing device 30 does not have to be provided, and the information processing device 2 does not have to communicate with an external device.

Figure 5:
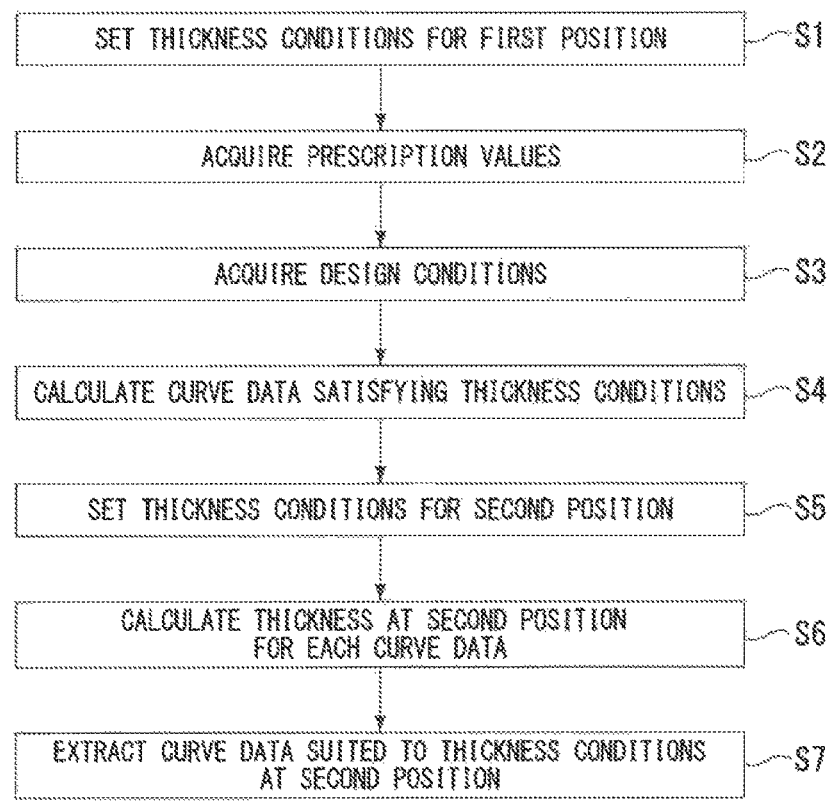
FIG. 5 is a flowchart showing a lens design method according to the present embodiment.

Next, a lens design method according to the present embodiment is described on the basis of the configuration of the above-described lens design system. FIG. 5 is a flowchart showing the lens design method according to the present embodiment.

At Step S1 in FIG. 5, the first calculation unit 5 in the information processing device 2 acquires a first position and thickness conditions at the first position from the storage unit 8, and sets the thickness conditions for the first position. At Step S2, the first calculation unit 5 acquires prescription values from the storage unit 8. At Step S3, the first calculation unit 5 collates the prescription values acquired at Step S2 with design conditions shown in FIG. 3 to acquire design conditions (design parameters) suited to the prescription values. At Step S4, the first calculation unit 5 calculates a plurality of sets of curve data in accordance with the design conditions acquired at Step S3. The first calculation unit 5 stores the plurality of calculated sets of curve data in the storage unit 8.

At Step S5 in FIG. 5, the second calculation unit 6 acquires thickness conditions at a second position from the storage unit 8, and sets the thickness conditions for the second position. At Step S6, the second calculation unit 6 reads the plurality of sets of curve data calculated by the first calculation unit 5 from the storage unit 8 for each curve data, and calculates the thickness at the second position indicated by each set of curve data. The second calculation unit 6 stores the calculated thickness at the second position in the storage unit 8. The second calculation unit 6 repeats the processing of calculating the thickness at the second position indicated by the next curve data and storing the calculation result in the storage unit 8.

Figures 6, 7:
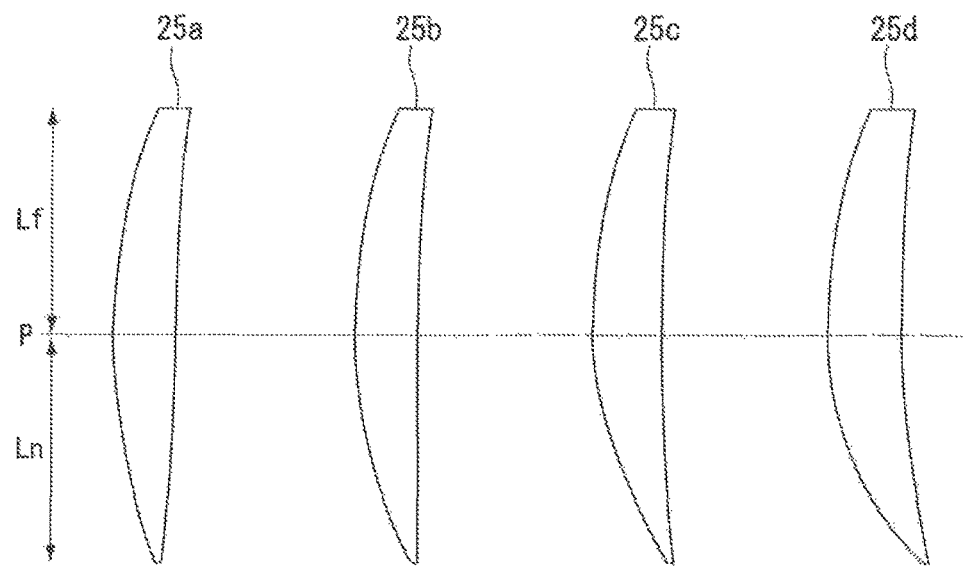
FIG. 6 is a diagram shoving a plurality of lenses the curves of which are changed.
FIG. 7 is a diagram showing specifications of the lenses in FIG. 6.

FIG. 6 is a diagram showing an example of a plurality of lenses with changed curves. FIG. 7 is a table showing specifications of the lenses in FIG. 6. A lens 25*a*, a lens 25*b*, a lens 25*c*, and a lens 25*d* shown in FIG. 6 correspond to curve data calculated in accordance with setting conditions in cells shown in FIG. 3. In Table 1 in FIG. 7, the number (indicated by [No.]) 1 shows the specifications of the lens 25*a* in FIG. 6, and the number 2, the number 3, and the number 4 show the specifications of the lens 25*b*, the lens 25*c*, and the lens 25*d*, respectively.

In the present example, the first position is set to the position of the lower end in the wearing state, and the thickness at the first position is indicated by [EDGE THICKNESS 1] in Table 1 in FIG. 7. [CENTER THICKNESS] is the thickness at the optical center shown in FIGS. 1A to 1C, and [EDGE THICKNESS 2] is the thickness at the upper end in the wearing state. The change step in FIG. 3 is 0.25, but FIG. 6 representatively shows curve data with a change step of 2.

As shown in FIG. 6 and FIG. 7, when the curve values included in the curve data are changed, the center thickness, the edge thicknesses, and other parameters change. For example, when the second position is set to the optical center P, and the condition that the thickness at the optical center P is minimum is imposed, desired curve data is obtained by selecting curve data of number 1. When the second position is set to the upper end in the wearing state and the condition that the thickness at the upper end is close to 5 mm is imposed, desired curve data is obtained by selecting curve data of number 3.

At Step S7 in FIG. 5, the extraction unit 7 reads the calculation results of the second calculation unit 6 from the storage unit 8, and extracts curve data suited to the thickness conditions for the second position. For example, in the example shown in FIG. 6 and FIG. 7, when the condition that the thickness at the optical center P is minimum is set, the extraction unit 7 extracts curve data (in the present example, number 1) in which the value of the item [CENTER THICKNESS] is the smallest. When the condition that the thickness at the upper side in the wearing state is close to a designated value is set, the extraction unit 7 compares the value of [EDGE THICKNESS 2] in each curve data with the designated value, and extracts curve data of [EDGE THICKNESS 2] that has the smallest difference from the designated value.

In the manner described above, the lens design method according to the present embodiment enables a progressive power lens to be designed such that prescription values are met and a desired condition is imposed on a thickness at a second position while a thickness condition, for a first position is satisfied. The designed progressive power lens is manufactured by preparing a lens blank and processing the lens blank into the designed shape by profiling, such as cutting and grinding.

A reference surface of a semi-finished lens is designed to have such a shape that can obtain the most preferable optical performance in a particular prescribed power in a common power range (base curve section). Thus, when the particular prescribed power is set as a reference power of the semi-finished lens, the optical performance of the lens for a prescribed power near the reference power is satisfactory, but the optical performance is reduced as the prescribed power deviates from the reference power. Changing each of the shape of the object-side surface and the shape of the eyeball-side surface as in the present embodiment enables the optical performance in the wearing state to be easily suited to prescription values.

In the present embodiment, the information processing device 2 includes a computer including a CPU and a memory. In the information processing device 2, the computer executes various kinds of processing in accordance with a lens design program. This program causes the computer to execute: changing a curve value set including a curve value of a distance vision part and a curve value of a near-vision part of a progressive power lens on an object side and a curve value of a distance vision part and a curve value of a near vision part of the progressive power lens on an eyeball side to calculate a plurality of curve value sets that satisfy thickness conditions for a first position on the progressive power lens; and calculating, for each of the calculated curve value sets, a thickness at a second position on the progressive power lens. This program may be stored in a computer-readable storage medium, such as an optical disc, a CD-ROM, a USB memory, or an SD card, and then provided.

The technical scope of the present invention is not limited to the above-described embodiments. For example, one or more elements described in the above-described embodiments may be omitted. The elements described in the above-described embodiments can be combined as appropriate.

DESCRIPTION OF REFERENCE SIGNS 1 lens design system, 5 first calculation unit, 6 second calculation unit, 7 extraction unit.

What is claimed is:

1. A lens design method comprising:
acquiring prescription values for a wearer who wears a spectacle lens, the prescription values including a spherical power, an addition, an astigmatism axis, and an astigmatic power;
displaying a progressive power lens and a spectacle frame on a display device in a superimposed manner;
acquiring coordinates of a first position designated by an operator on the progressive power lens displayed on the display device by detecting an input made by an input device and acquiring thickness conditions at the first position;
preparing a storage unit storing a database of design conditions that are indicated by a table function of which arguments are prescription values of spherical powers, additions, astigmatism axes, and astigmatic powers, and that include each upper limit value and each upper lower limit value of curve values of a distance vision part and curve values of a near vision part of a progressive power lens on an object side, and curve values of a distance vision part and curve values of a near vision part of the progressive power lens on an eyeball side;
reading the design conditions suited to the prescription values from the database;
changing curve data, the curve data including the curve value of the distance vision part and the curve value of the near vision part on the object side, and the curve value of the distance vision part and the curve value of the near vision part on the eyeball side, between an upper limit value and a lower limit value that are included in the design conditions that have been read so as to calculate a plurality of sets of the curve data;
acquiring coordinates of a second position designated by the operator on the progressive power lens displayed on the display device by detecting an input made by the input device;
calculating, for each of the calculated sets of the curve data, a thickness at the second position that satisfies thickness conditions for the first position;
associating each of the calculated sets of the curve data and the thickness at the second position for each of calculated sets of the curve data with each other and storing the same in the storage unit; and
from the plurality of sets of the curve data and the thicknesses at the second position associated therewith, which have been stored, detecting a thickness at the second position that satisfies a predetermined condition and extracting curve data associated with the thickness at the second position, and storing the curve data extracted and the thickness at the second position in the storage unit,
wherein each of the curve values of the distance vision part and each of the curve values of the near vision part of the progressive power lens on the object side, and each of the curve values of the distance vision part and each of the curve values of the near vision part of the progressive power lens on the eyeball side included in the design conditions in the database stored in the storage unit are calculated by using, respectively, a radius of curvature of the distance vision part and a radius of curvature of the near vision part of the progressive power lens on the object side, and a radius of curvature of the distance vision part and a radius of curvature of the near vision part of the progressive power lens on the eyeball side, and wherein each of the curve values (Ci) is represented by the following expression:

$$Ci=(I-1.0)\times 1000/R$$

where I is refractive index of a lens base with respect to the e-line, and R is radius of curvature in millimeters; and manufacturing the progressive power lens by processing a lens blank into a shape having a front surface and a back surface based on the curve data satisfying the predetermined condition.

2. The lens design method of claim 1, comprising changing the curve data in steps of a predetermined value.

3. The lens design method of claim 1, comprising changing the curve data by using shape information on a frame to be mounted with the progressive power lens and at least a part of wearer information including at least one information on a vertex distance, a dominant eye, or a near working distance of a wearer.

4. The lens design method of claim 1, wherein the predetermined condition comprises a condition that the thickness at the second position is minimum.

5. The lens design method of claim 1, wherein the predetermined condition comprises a condition that the thickness at the second position is closest to a designated value.

6. The lens design method of claim 1, wherein the second position is set to an optical center of the progressive power lens.

7. The lens design method of claim 1, wherein the second position is set to an edge of the progressive power lens.

8. The lens design method of claim 1, comprising setting at least one of a shape of an object-side surface of the progressive power lens or a shape of an eyeball-side surface of the progressive power lens by using at least one of an eccentric position, a corridor length, addition distribution information, a far point, a near point, and a reference center thickness in addition to the curve data satisfying the predetermined condition.

9. A nontransitory storage medium storing therein a program that causes a computer to execute:

acquiring prescription values for a wearer who wears a spectacle lens, the prescription values including a spherical power, an addition, an astigmatism axis, and an astigmatic power;

displaying a progressive power lens and a spectacle frame on a display device in a superimposed manner;

acquiring coordinates of a first position designated by an operator on the progressive power lens displayed on the display device by detecting an input made by an input device and acquiring thickness conditions at the first position;

preparing a storage unit storing a database of design conditions that are indicated by a table function of which arguments are prescription values of spherical powers, additions, astigmatism axes, and astigmatic powers, and that include each upper limit value and each upper lower limit value of curve values of a distance vision part and curve values of a near vision part of a progressive power lens on an object side, and curve values of a distance vision part and curve values of a near vision part of the progressive power lens on an eyeball side;

reading the design conditions suited to the prescription values from the database;

changing curve data, including the curve value of the distance vision part and the curve value of the near vision part on the object side, and the curve value of the distance vision part and the curve value of the near vision part on the eyeball side, between an upper limit value and a lower limit value that are included in the design conditions that have been read so as to calculate a plurality of sets of the curve data;

acquiring coordinates of a second position designated by the operator on the progressive power lens displayed on the display device by detecting an input made by the input device;

calculating, for each of the calculated sets of the curve data, a thickness at the second position that satisfies thickness conditions for the first position;

associating each of the calculated sets of the curve data and the thickness at the second position for each of calculated sets of the curve data with each other and storing the same in the storage unit; and from the plurality of sets of the curve data and the thicknesses at the second position associated therewith, which have been stored, detecting a thickness at the second position that satisfies a predetermined condition and extracting curve data associated with the thickness at the second position, and storing the curve data extracted and the thickness at the second position in the storage unit, wherein each of the curve values of the distance vision part and each of the curve values of the near vision part of the progressive power lens on the object side, and each of the curve values of the distance vision part and each of the curve values of the near vision part of the progressive power lens on the eyeball side included in the design conditions in the database stored in the storage unit are calculated by using, respectively, a radius of curvature of the distance vision part and a radius of curvature of the near vision part of the progressive power lens on the object side, and a radius of curvature of the distance vision part and a radius of curvature of the near vision part of the progressive power lens on the eyeball side, and wherein each of the curve values (Ci) is represented by the following expression:

$$Ci=(I-1.0)\times 1000/R$$

where I is refractive index of a lens base with respect to the e-line, and R is radius of curvature in millimeters, and manufacturing the progressive power lens by processing a lens blank into a shape having a front surface and a back surface based on the curve data satisfying the predetermined condition.

10. A lens design system comprising:

an information processing device including:
 a first calculation unit that acquires prescription values for a wearer who wears a spectacle lens, the prescription values including a spherical power, an addition, an astigmatism axis, and an astigmatic power;
 a display device that displays a progressive power lens and a spectacle frame on the display device in a superimposed manner,
  wherein the information processing device acquires coordinates of a first position designated by an operator on the progressive power lens displayed on the display device by detecting an input made by an input device and acquiring thickness conditions at the first position, and acquires coordinates of a second position designated by the operator on the progressive power lens displayed on the display device by detecting an input made by the input device;

a storage unit storing a database of design conditions that are indicated by a table function of which arguments are prescription values of spherical powers, additions, astigmatism axes, and astigmatic powers, and that include each upper limit value and each upper lower limit value of curve values of a distance vision part and curve values of a near vision part of a progressive power lens on an object side, and curve values of a distance vision part and curve values of a near vision part of the progressive power lens on an eyeball side, wherein the first calculation unit reads the design conditions suited to the prescription values from the database, the first calculation unit changes curve data including a curve value of a distance vision part and a curve value of a near vision part of a progressive power lens on an object side, and a curve value of a distance vision part and a curve value of a near vision part of the progressive power lens on an eyeball side between an upper limit value and a lower limit value that are included in the design conditions that have been read so as to calculate a plurality of sets of the curve data;

a second calculation unit that calculates, for each of the calculated sets of the curve data, a thickness at a second position on the progressive power lens that satisfies thickness conditions for a first position on the progressive power lens, and associates each of the calculated sets of the curve data and the thickness at the second position for each of calculated sets of the curve data with each other and storing the same in the storage unit; and an extraction unit that associates each of the calculated sets of the curve data and the thickness at the second position for each of calculated sets of the curve data with each other and storing the same in the storage unit, and from the plurality of sets of the curve data and the thicknesses at the second position associated therewith, which have been stored, the extraction unit detects a thickness at the second position that satisfies a predetermined condition and extracts curve data associated with the thickness at the second position, and stores the curve data extracted and the thickness at the second position in the storage unit, wherein each of the curve values of the distance vision part and each of the curve values of the near vision part of the progressive power lens on the object side, and each of the curve values of the distance vision part and each of the curve values of the near vision part of the progressive power lens on the eyeball side included in the design conditions in the database stored in the storage unit are calculated by using, respectively, a radius of curvature of the distance vision part and a radius of curvature of the near vision part of the progressive power lens on the object side, and a radius of curvature of the distance vision part and a radius of curvature of the near vision part of the progressive power lens on the eyeball side, and wherein each of the curve values ($C_i$) is represented by the following expression:

$$C_i = (I-1.0) \times 1000/R$$

where I is refractive index of a lens base with respect to the e-line, and R is radius of curvature in millimeters; and a manufacturing device configured to manufacture the progressive power lens by processing a lens blank into a shape having a front surface and a back surface based on the curve data satisfying the predetermined condition.

* * * * *